(12) United States Patent
Huang

(10) Patent No.: US 11,628,777 B2
(45) Date of Patent: *Apr. 18, 2023

(54) SWING LOCKING MECHANISM FOR BICYCLE RACK AND BICYCLE RACK HAVING THE SAME

(71) Applicant: YOTTA INNOVATION CO., LTD., Apia (WS)

(72) Inventor: Stella Huang, Taipei (TW)

(73) Assignee: YOTTA INNOVATION CO., LTD.

( * ) Notice: Subject to any disclaimer, the term of this patent is extended or adjusted under 35 U.S.C. 154(b) by 93 days.

This patent is subject to a terminal disclaimer.

(21) Appl. No.: 17/308,699

(22) Filed: May 5, 2021

(65) Prior Publication Data
US 2022/0355743 A1 Nov. 10, 2022

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................................. B60R 9/06; B60R 9/10
USPC ......................................................... 224/569
See application file for complete search history.

(56) References Cited

U.S. PATENT DOCUMENTS

| | | | | |
|---|---|---|---|---|
| 4,400,129 A * | 8/1983 | Eisenberg | ................. | B60R 9/06 224/532 |
| 6,129,371 A * | 10/2000 | Powell | ...................... | B60R 9/06 280/491.5 |
| 8,991,224 B2 * | 3/2015 | Zalavari | .................. | F41A 23/18 70/279.1 |
| 9,987,998 B2 * | 6/2018 | Shen | ......................... | B60R 9/06 |
| 10,183,627 B1 * | 1/2019 | Liu | ............................ | B60R 9/06 |
| 10,384,620 B2 * | 8/2019 | Prescott | .................... | B60R 9/06 |
| 10,906,473 B1 * | 2/2021 | Yu | .............................. | B60R 9/06 |
| 11,148,607 B1 * | 10/2021 | Hsieh | ...................... | B60R 9/045 |
| 11,383,779 B1 * | 7/2022 | Huang | ..................... | B62H 3/00 |
| 2005/0056672 A1 * | 3/2005 | Stewart | ..................... | B60R 9/10 224/504 |
| 2008/0099522 A1 * | 5/2008 | Clausen | .................... | B60R 9/06 224/519 |
| 2014/0246467 A1 * | 9/2014 | Hein | ......................... | B60R 9/06 224/400 |
| 2022/0212737 A1 * | 7/2022 | Huang | ................... | B62H 5/005 |

* cited by examiner

*Primary Examiner* — Peter N Helvey
(74) *Attorney, Agent, or Firm* — Muncy, Geissler, Olds & Lowe, P.C.

(57) ABSTRACT

A swing locking mechanism and a bicycle rack having the same are provided. The swing locking mechanism is configured to be assembled with a pivot seat of the bicycle rack, and the pivot seat includes at least one first engaging portion. The swing locking mechanism includes a movable rod, a handle and a control assembly.

The movable rod includes at least one second engaging portion which is releasably engaged with the at least one first engaging portion and is movable between a locking position and a release position. The handle is fixedly disposed on the movable rod. The control assembly is connected with the at least one second engaging portion and includes an operating member located between the movable rod and the handle. The operating member is rotatable to drive the at least one second engaging portion to move.

10 Claims, 5 Drawing Sheets

SWING LOCKING MECHANISM FOR BICYCLE RACK AND BICYCLE RACK HAVING THE SAME

BACKGROUND OF THE INVENTION

Field of the Invention

The present invention relates to a swing locking mechanism for a bicycle rack and a bicycle rack having the same.

Description of the Prior Art

A conventional bicycle rack includes a first rod member configured to be assembled to a vehicle and a second rod member swingably connected with the first rod member. The first rod member and the second rod member has an engaging mechanism disposed therebetween so that the second rod member can be positioned in a folding position or a loading position relative to the first rod member. Therefore, the bicycle rack is foldable in a direction toward the vehicle when it is not in use to has a small volume and avoid unexpected collision.

However, an adjustment position of the engaging mechanism is usually close to the first rod member and is far away from a operational position where an user pushes or pulls the second rod member so that the user cannot adjusted the second rod member by one hand, which is inconvenient to use. In addition, the adjustment position of another type of the engaging mechanism is the same with the operational, which may cause components of the engaging mechanism to be easy to be broken due to improper force.

The present invention is, therefore, arisen to obviate or at least mitigate the above-mentioned disadvantages.

SUMMARY OF THE INVENTION

The main object of the present invention is to provide a swing locking mechanism for a bicycle rack and a bicycle rack having the same, and the swing locking mechanism is easy to operate and durable.

To achieve the above and other objects, the present invention provides a swing locking mechanism for a bicycle rack. The swing locking mechanism is configured to be assembled to a pivot seat of a bicycle rack, and the pivot seat includes at least one first engaging portion. The swing locking mechanism includes a movable rod, a handle and a control assembly. The movable rod is configured to be movably assembled to the pivot seat and includes at least one second engaging portion which is releasably engaged with the at least one first engaging portion and is movable between a locking position and a release position. The handle is fixedly disposed on the movable rod. The control assembly is connected with the at least one second engaging portion and includes an operating member located between the movable rod and the handle. The operating member is configured to be operated externally and is rotatable to drive the at least one second engaging portion to move. When the at least one second engaging portion is in the locking position, the at least one second engaging portion is engaged with the at least one first engaging portion, and the movable rod is non-swingable relative to the pivot seat. When the operating member is rotated to drive the at least one second engaging portion to move toward the release position, the at least one second engaging portion is disengaged from the at least one first engaging portion, and the movable rod is swingable relative to the pivot seat.

To achieve the above and other objects, the present invention further provides a bicycle rack, including the swing locking mechanism as described above, further including a hanging member and at least one holding frame. The hanging member has the pivot seat disposed thereon and configured to be detachably assembled to a hanging mechanism of a vehicle. The at least one holding frame is connected with the swing locking mechanism and configured to carry at least one bicycle.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
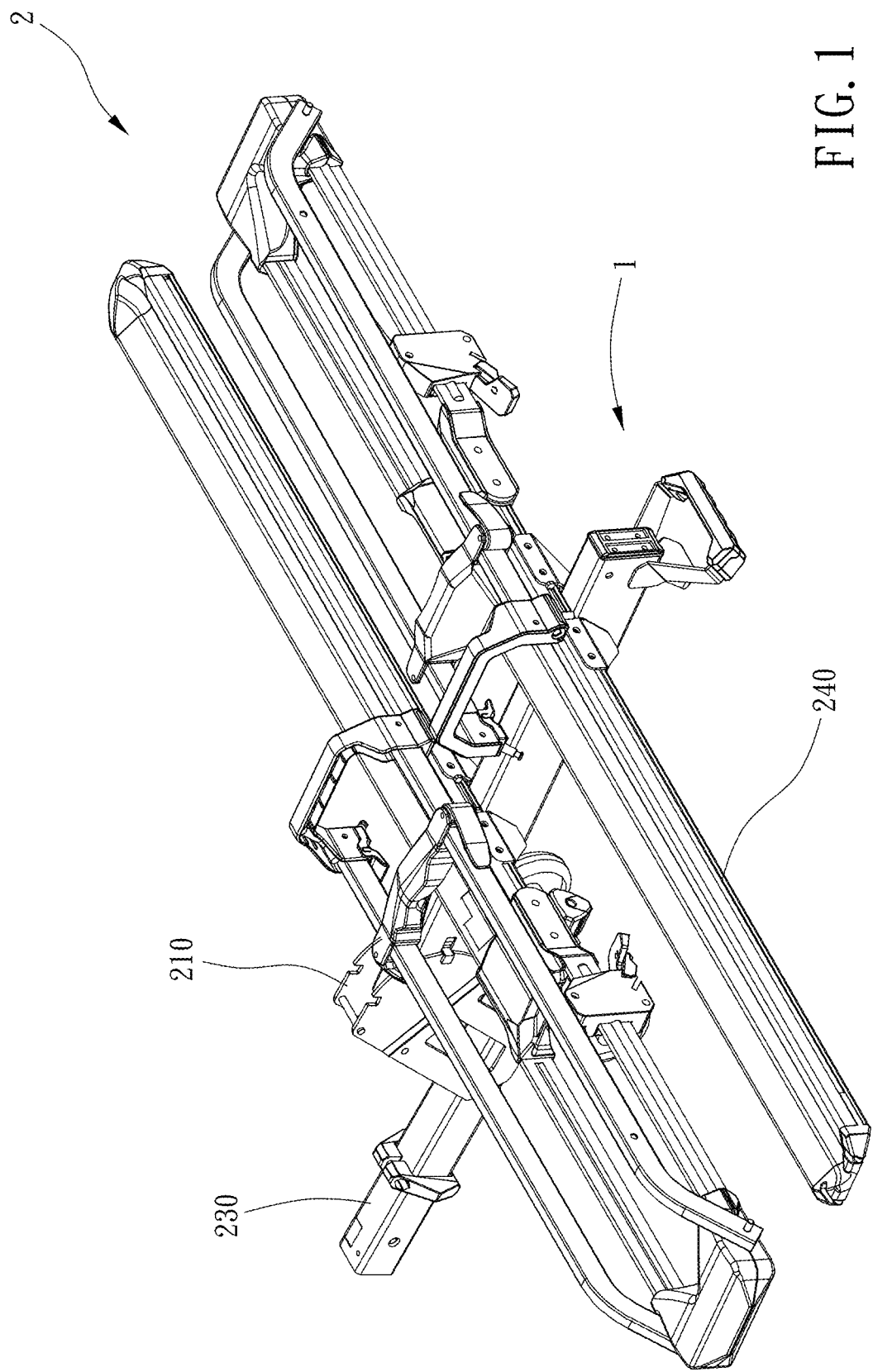
FIG. 1 is a stereogram of a preferable embodiment of the present invention.
Figure 2:
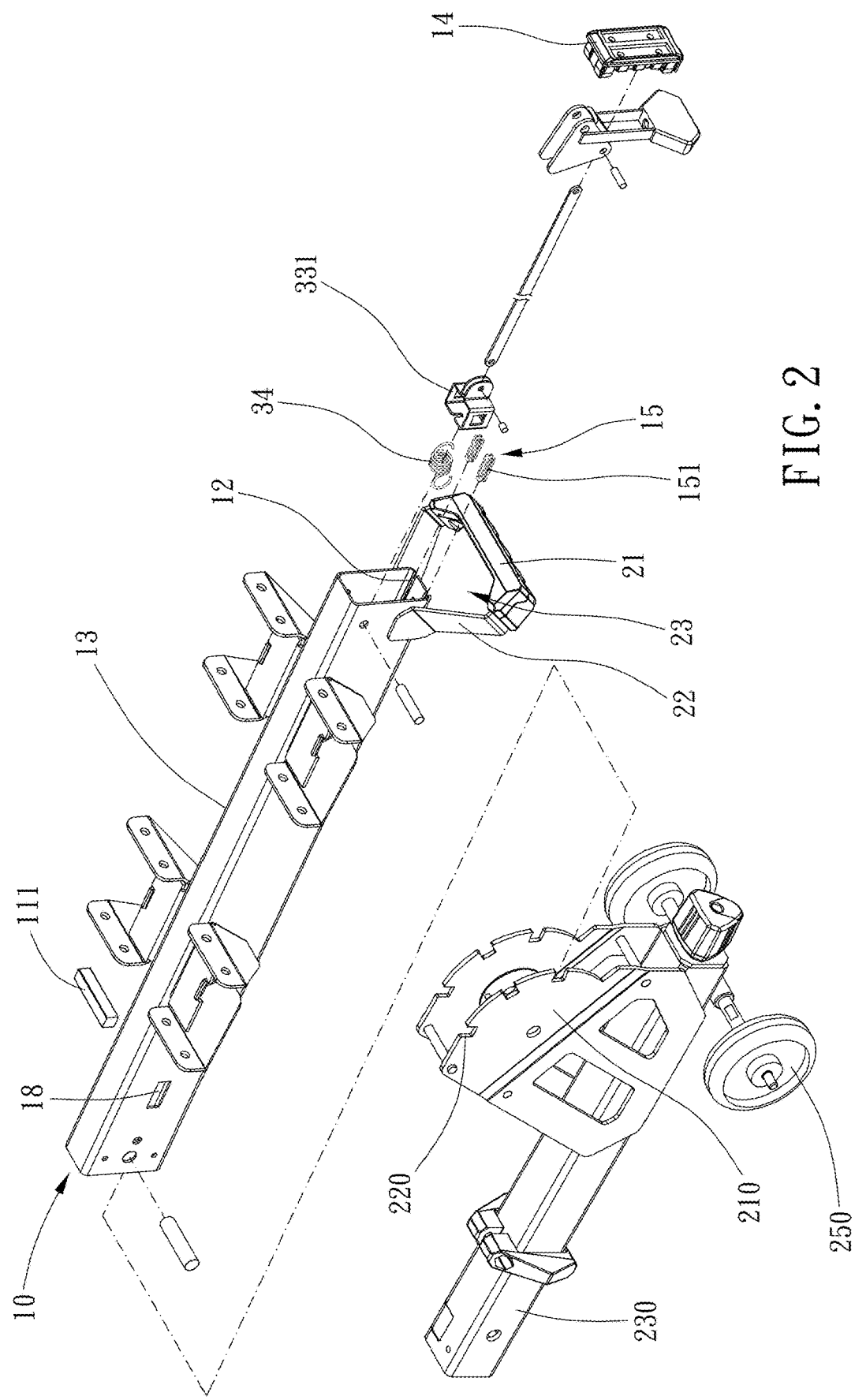
FIG. 2 is a breakdown drawing of a preferable embodiment of the present invention.

Please refer to FIGS. 1 to 5 for a preferable embodiment of the present invention. A swing locking mechanism 1 of the present invention is configured to be assembled to a pivot seat 210 of a bicycle rack 2, and the pivot seat 210 includes at least one first engaging portion 220. The swing locking mechanism 1 includes a movable rod 10, a handle 20 and a control assembly 30.

The movable rod 10 is configured to be movably assembled to the pivot seat 210 and includes at least one second engaging portion 11 which is releasably engaged with the at least one first engaging portion 220. The at least one second engaging portion 11 is movable between a locking position and a release position. The handle 20 is fixedly disposed on the movable rod 10. The control assembly 30 is connected with the at least one second engaging portion 11 and includes an operating member 31 located between the movable rod 10 and the handle 20. The operating member 31 is configured to be operated externally and is rotatable to drive the at least one second engaging portion 11 to move. When the at least one second engaging portion 11 is in the locking position, the at least one second engaging portion 11 is engaged with the at least one first engaging portion 220, and the movable rod 10 is non-swingable relative to the pivot seat 210. When the operating member 31 is rotated to drive the at least one second engaging portion 11 to move toward the release position, the at least one second engaging portion 11 is disengaged from the at least one first engaging portion 220, and the movable rod 10 is swingable relative to the pivot seat 210. Therefore, the handle 20 is configured to be pulled or pushed, which is convenient to operate and prevents the control assembly 30 from being damaged.

Figure 3:
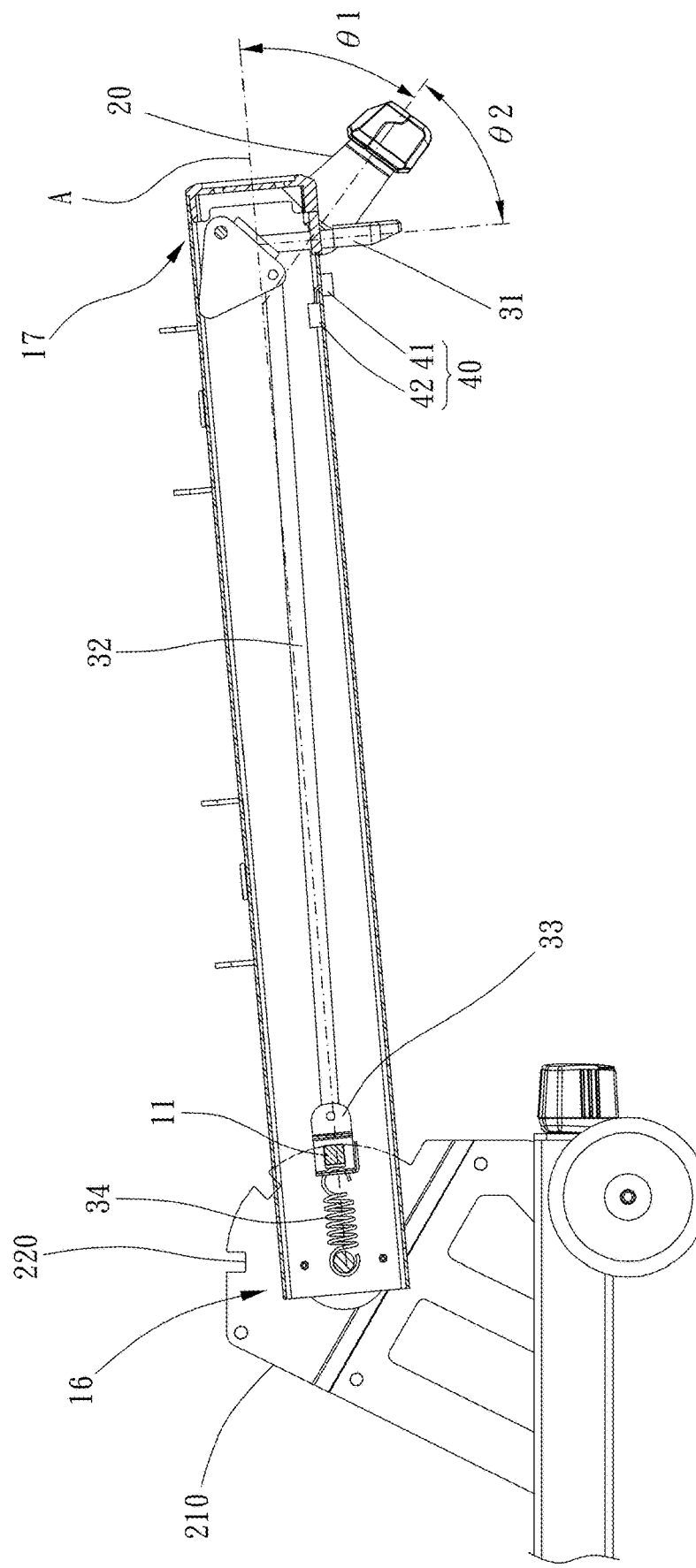
FIGS. 3-5 are drawings showing operation according to a preferable embodiment of the present invention.
Figure 5:
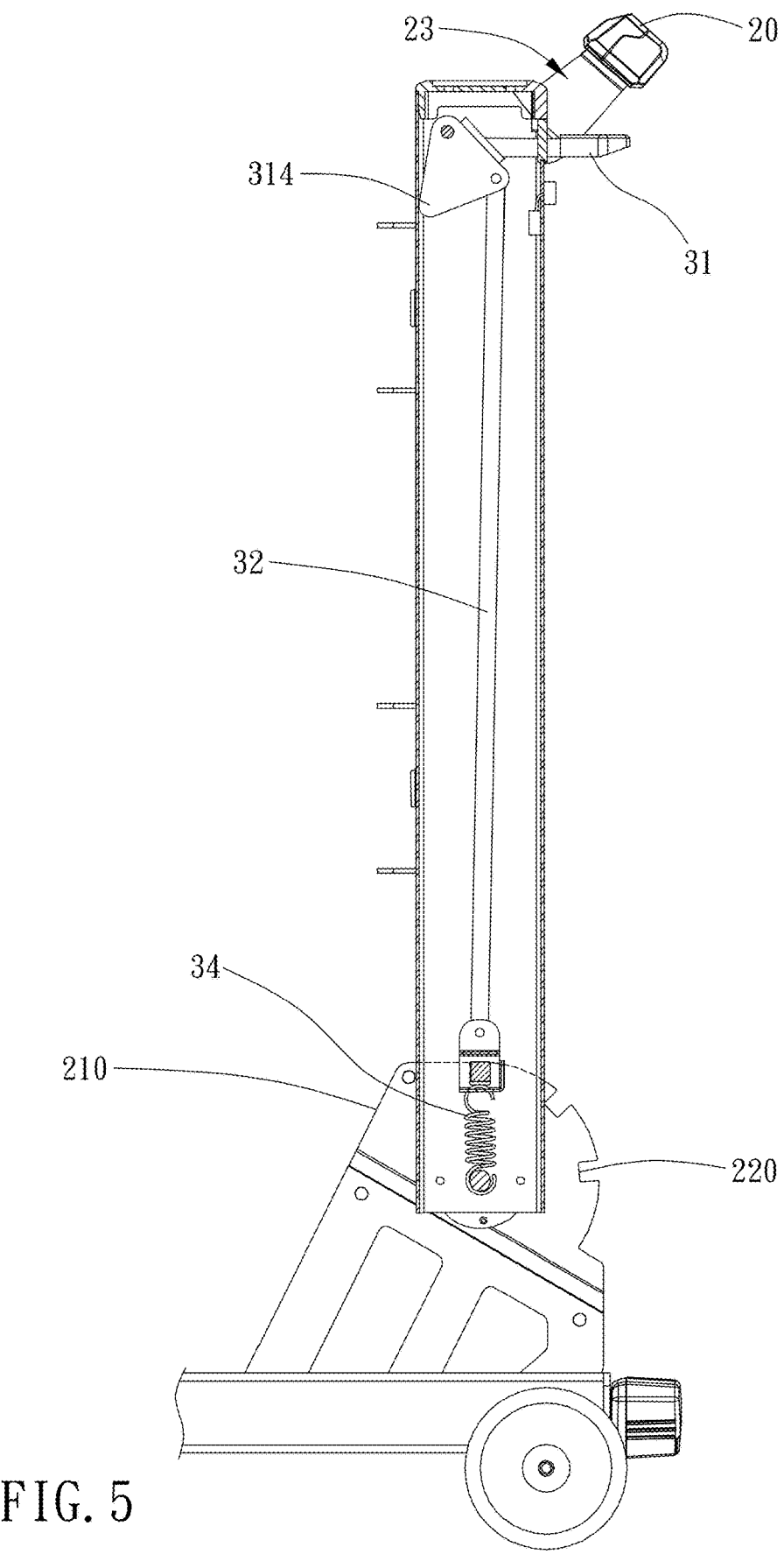

The control assembly 30 further includes an actuating rod 32 connected with the at least one second engaging portion 11, and the operating member 31 includes a pivot portion 311 rotatably connected with the movable rod 10 and a swinging portion 312 extending radially relative to the pivot portion 311. The actuating rod 32 is rotatably connected with the swinging portion 312 so that the actuating rod 32 is driven by rotation of the operating member 31 to move axially and drive the at least one second engaging portion 11 to move between the locking position and the release position, which has a simple structure and is easy to operate. The movable rod 10 defines an axial direction A and has at least one guiding groove 12 extending in the axial direction A and radially disposed therethrough, and the operating member 31 is movably disposed through the at least one guiding groove 12 so as to be well guided for smooth movement. Specifically, the operating member 31 includes at least one arm portion 313 disposed through the at least one guiding groove 12. As shown in FIGS. 3 and 5, the at least one arm portion 313 is vertical to the axial direction A when the at least one second engaging portion 11 is in the locking position, which allows the operating member 31 to keep a proper distance from the handle 20 so as to be easy actuated and avoid unexpected movement. The movable rod 10 includes a tube body 13 and a lid body 14 covering an end opening of the tube body 13, and each of the at least one guiding groove 12 is open toward the end opening, which is convenient for processing and assembling of components. The movable rod 10 further includes at least one cushion 15 disposed within the at least one guiding groove 12, and a thickness of each of the at least one cushion 15 is larger than a wall thickness of the tube body 13 so as to provide cushioning effect and avoid abrasion of the operating member 31. In this embodiment, each of the at least one cushion 15 includes an engaging slot 151 corresponding to the tube body 13, and a wall of the tube body 13 is embedded within the engaging slot 151, which is easy to be assembled. However, the movable rod may not have the at least one cushion; the thickness of each of the at least one cushion may be smaller than or equal to the wall thickness of the tube body, and the at least one cushion may be directly attached to the tube body.

Figure 4:
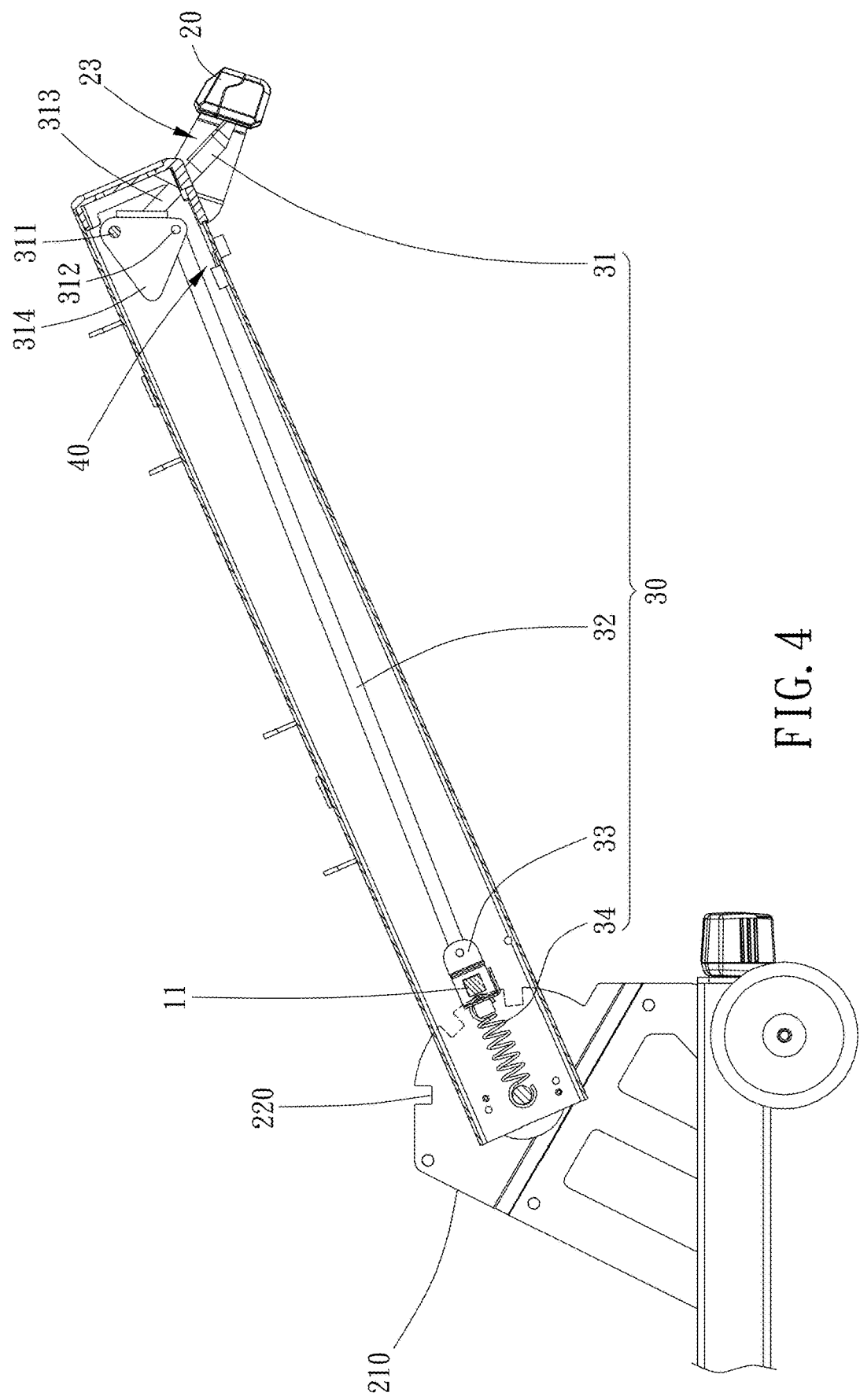

The movable rod 10 further includes a first end 16 configured to be assembled to the pivot seat 210 and a second end 17 axially opposite to the first end 16, and the handle 20 is fixedly disposed on the second end 17 and obliquely extends beyond the second end 17 in a direction remote from the axial direction A for easy operation. Please refer to FIG. 3, the handle 20 is tilted in a direction remote form a side of the movable rod 10 configured for at least one holding frame 240 to be disposed thereon, and an angle 01 between an extending direction of the handle 20 and the axial direction A is between 20 degrees and 80 degrees. Therefore, the force arm defined between the handle 20 and the pivot seat 210 is longer and the movable rod 10 is pushed and rotated upwardly, which is laborsaving. In this embodiment, the operating member 31 is swingable between a first position and a second position relative to the movable rod 10. The handle 20 includes a handling portion 21 and two connection arms 22 connected with two opposite sides of the handling portion 21, and the two connection arms 22 and the handling portion 21 define an operating space 23 therebetween. When the operating member 31 is in the first position and the at least one second engaging portion 11 is in the locking position, at least part of the operating member 31 is dislocated with respect to the handle 20 and located out of the operating space 23, as shown in FIGS. 3 and 5. When the operating member 31 is in the second position and the at least one second engaging portion 11 is in the release position, the operating member 31 is located within the operating space 23, as shown in FIG. 4. When the at least one second engaging portion 11 is in the locking position, an angle 02 between an extending direction of the operating member 31 and the extending direction of the handle 20 is preferably between 10 degrees and 70 degrees. In operation, an operator can hold the handling portion 21 with the palm facing upward and pull the operating member 31 with fingers to move the at least one second engaging portion 11 to the release position, which is convenient to be operated by one hand. In other embodiments, the operating member may be swung out of the operating space; the handle may have only one said connection arm, and the operating member is swingable at a side of the said connection aim.

Specifically, the movable rod 10 includes at least one restricting groove 18, and the at least one second engaging portion 11 has at least one restricting member 111 which is slidably disposed through the at least one restricting groove 18. The control assembly 30 further includes a connecting member 33 connected the restricting member 111 with the actuating rod 32. The connecting member 33 is a rectangular frame and includes two sidewalls 331 spaced apart from each other, and the restricting member 111 is disposed through the two sidewalls 331 and the movable rod 10 so as to stably drive the restricting member 111 to move and have a simple structure, light weight and easy assembling. An elastic member 34 is disposed between the connecting member 33 and one of the pivot seat 210 and the movable rod 10, and the elastic member 34 is connected with the connecting member 33 so that the at least one second engaging portion 11 has a tendency to move in a direction toward the locking position. Therefore, when the operating member 31 is in the second position and the at least one second engaging portion 11 is dislocated with respect to the at least one first engaging portion 220, the restricting member 111 is abutted against the pivot seat 210 and keeps the at least one second engaging portion 11 in the release position (as shown in FIG. 4) so that the movable rod 10 is adjustable without pressing the operating member 31. When the at least one second engaging portion 11 corresponds to the at least one first engaging portion 220, the elastic member 34 drives the at least one second engaging portion 11 to move to the locking position and drives the operating member 31 to move to the first position (as shown in FIG. 5), which is easy to be operated. Preferably, the operating member 31 further includes a blocking portion 314, and the blocking portion 314 is interferable with the movable rod 10 in a rotational direction of the operating member 31 about the swinging portion 312. When the operating member 31 is driven by the elastic member 34 and moved from the second position to the first position, the blocking portion 314 is abuttable against the movable rod 10 so as to prevent the operating member 31 from over-swinging and being damaged.

The bicycle rack swing locking mechanism 1 further includes a prompt unit 40. The prompt unit 40 is disposed on at least one of the movable rod 10, the handle 20 and the control assembly 30, and the prompt unit 40 is actuated to generate a prompt signal when the operating member 31 is moved relative to the handle 20 to drive the at least one second engaging portion 11 to move toward the release position for operational safety. The prompt unit 40 includes a sensor 41 and a prompt member 42 being in communication with the sensor 41, and the sensor 41 is disposed on the movable rod 10 and corresponds to the operating member 31. When a distance between the operating member 31 and the sensor 41 is changed, the sensor 41 generates a sensing signal and drives the prompt member 42 to generate the prompt signal. The sensor 41 may be an infrared distance sensor, a pressure sensor, a displacement sensor or the like, and the prompt member 42 may be a speaker, a lighting device or the like. In other embodiment, the prompt unit may be a magnetic actuation device which is actuated by a change of magnetic strength; the prompt unit may be disposed on the handle and actuated when the operating member is close to the handle.

The present invention further provides a bicycle rack 2, including the swing locking mechanism 1 as described above, further including: a hanging member 230 and at least one holding frame 240. The hanging member 230 has the pivot seat 210 disposed thereon and configured to be detachably assembled to a hanging mechanism of a vehicle. The at least one holding frame 240 is connected with the swing locking mechanism 1 and configured to carry at least one bicycle. Preferably, a sides of the hanging member 230 adjacent to the pivot seat 210 has at least one wheel member 250 disposed thereon so that the bicycle rack 2 is movable by the at least one wheel member 250, which is laborsaving.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A swing locking mechanism, configured to be assembled to a pivot seat of a bicycle rack, the pivot seat including at least one first engaging portion, the swing locking mechanism including:
  a movable rod, configured to be movably assembled to the pivot seat, including at least one second engaging portion which is releasably engaged with the at least one first engaging portion and is movable between a locking position and a release position;
  a handle, fixedly disposed on the movable rod; and
  a control assembly, connected with the at least one second engaging portion and including an operating member located between the movable rod and the handle, the operating member configured to be operated externally and being rotatable to drive the at least one second engaging portion to move;
  wherein when the at least one second engaging portion is in the locking position, the at least one second engaging portion is engaged with the at least one first engaging portion, and the movable rod is non-swingable relative to the pivot seat; when the operating member is rotated to drive the at least one second engaging portion to move toward the release position, the at least one second engaging portion is disengaged from the at least one first engaging portion, and the movable rod is swingable relative to the pivot seat.

2. The swing locking mechanism of claim 1, wherein the movable rod defines an axial direction and further includes a first end configured to be assembled to the pivot seat and a second end axially opposite to the first end, and the handle is fixedly disposed on the second end and obliquely extends beyond the second end in a direction remote from the axial direction.

3. The swing locking mechanism of claim 2, wherein the handle is tilted in a direction remote form a side of the movable rod configured for at least one holding frame to be disposed thereon, and an angle between an extending direction of the handle and the axial direction is between 20 degrees and 80 degrees.

4. The swing locking mechanism of claim 1, wherein the operating member is swingable between a first position and a second position relative to the movable rod; the handle includes a handling portion and two connection arms connected with two opposite sides of the handling portion, the two connection arms and the handling portion define an operating space therebetween; when the operating member is in the first position and the at least one second engaging portion is in the locking position, at least part of the operating member is dislocated with respect to the handle and located out of the operating space; and when the operating member is in the second position and the at least one second engaging portion is in the release position, the operating member is located within the operating space.

5. The swing locking mechanism of claim 1, wherein when the at least one second engaging portion is in the locking position, an angle between an extending direction of the operating member and an extending direction of the handle is between 10 degrees and 70 degrees.

6. The swing locking mechanism of claim 1, further including a prompt unit, wherein the prompt unit is disposed on at least one of the movable rod, the handle and the control assembly, and the prompt unit is actuated to generate a prompt signal when the operating member is moved relative to the handle to drive the at least one second engaging portion to move toward the release position.

7. The swing locking mechanism of claim 1, wherein the movable rod defines an axial direction and has at least one guiding groove extending in the axial direction and radially disposed therethrough, and the operating member is movably disposed through the at least one guiding groove.

8. The swing locking mechanism of claim 7, wherein the operating member includes at least one arm portion disposed through the at least one guiding groove, and the at least one arm portion is vertical to the axial direction when the at least one second engaging portion is in the locking position.

9. The swing locking mechanism of claim 8, wherein the movable rod includes a first end configured to be assembled with the pivot seat and a second end axially opposite to the first end, the handle is fixedly disposed on the second end and obliquely extends beyond the second end in a direction remote from the axial direction; the handle is tilted in a direction remote form a side of the movable rod configured for at least one holding frame to be disposed thereon, and an angle between an extending direction of the handle and the axial direction is between 20 degrees and 80 degrees; the operating member is swingable between a first position and a second position relative to the movable rod; the handle includes a handling portion and two connection arms connected with two opposite sides of the handling portion, the two connection arms and the handling portion define an operating space therebetween; when the operating member is in the first position and the at least one second engaging portion is in the locking position, at least part of the operating member is dislocated with respect to the handle and located out of the operating space; when the operating member is in the second position and the at least one second engaging portion is in the release position, the operating member is located within the operating space; when the at least one second engaging portion is in the locking position, an angle between an extending direction of the operating member and the extending direction of the handle is between 10 degrees and 70 degrees; the bicycle rack swing locking mechanism further includes a prompt unit, the prompt unit is disposed on at least one of the movable rod, the handle and the control assembly, and the prompt unit is actuated to generate a prompt signal when the operating member is moved relative to the handle to drive the at least one second engaging portion to move toward the release position; the prompt unit includes a sensor and a prompt member being in communication with the sensor, the sensor is disposed on the movable rod and corresponds to the operating member, when a distance between the operating member and the sensor is changed, the sensor generates a sensing signal and drives the prompt member to generate the prompt signal; the control assembly includes an actuating rod connected with the at least one second engaging portion, the operating member includes a pivot portion rotatably connected with the movable rod and a swinging portion extending radially relative to the pivot portion, the actuating rod is rotatably connected with the swinging portion; the movable rod includes at least one restricting groove, the at least one second engaging portion has at least one restricting member which is slidably disposed through the at least one restricting groove; the control assembly further includes a connecting member connected the restricting member with the actuating rod, the connecting member is a rectangular frame and includes two sidewalls spaced apart from each other, the restricting member is disposed through the two sidewalls and the movable rod; an elastic member is disposed between the connecting member and one of the pivot seat and the movable rod, the elastic member is connected with the connecting member so that the at least one second engaging portion has a tendency to move in a direction toward the locking position; the movable rod further includes a tube body and an lid body covering an end opening of the tube body, each of the at least one guiding groove is open toward the end opening; and the movable rod further includes at least one cushion disposed within the at least one guiding groove, and a thickness of each of the at least one cushion is larger than a wall thickness of the tube body.

10. A bicycle rack, including the swing locking mechanism of claim 1, further including:

a hanging member, having the pivot seat disposed thereon and configured to be detachably assembled to a hanging mechanism of a vehicle; and at least one holding frame, connected with the swing locking mechanism and configured to carry at least one bicycle.

\* \* \* \* \*